US008914765B2

(12) United States Patent
Sigal et al.

(10) Patent No.: US 8,914,765 B2
(45) Date of Patent: Dec. 16, 2014

(54) POWER GRID GENERATION THROUGH MODIFICATION OF AN INITIAL POWER GRID BASED ON POWER GRID ANALYSIS

(71) Applicant: International Business Machines Corporation, Armonk, NY (US)

(72) Inventors: Leon J. Sigal, Monsey, NY (US); James D. Warnock, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/741,594

(22) Filed: Jan. 15, 2013

(65) Prior Publication Data

US 2014/0201695 A1    Jul. 17, 2014

(51) Int. Cl.
*G06F 17/50*    (2006.01)

(52) U.S. Cl.
CPC .................................. *G06F 17/5077* (2013.01)
USPC ............................ 716/133; 716/120; 716/132

(58) Field of Classification Search
USPC ......................................... 716/120, 132–133
See application file for complete search history.

(56) References Cited

U.S. PATENT DOCUMENTS

| | | | | |
|---|---|---|---|---|
| 5,598,348 A * | 1/1997 | Rusu et al. | | 716/115 |
| 5,648,910 A * | 7/1997 | Ito | | 716/104 |
| 5,987,086 A * | 11/1999 | Raman et al. | | 716/120 |
| 6,305,000 B1 | 10/2001 | Phan et al. | | |
| 6,311,147 B1 * | 10/2001 | Tuan et al. | | 703/18 |
| 6,446,245 B1 * | 9/2002 | Xing et al. | | 716/120 |
| 6,480,989 B2 * | 11/2002 | Chan et al. | | 716/120 |
| 6,523,154 B2 * | 2/2003 | Cohn et al. | | 716/112 |
| 6,598,206 B2 | 7/2003 | Darden et al. | | |
| 6,609,242 B1 | 8/2003 | Slade | | |
| 6,675,139 B1 * | 1/2004 | Jetton et al. | | 703/17 |
| 6,701,509 B2 | 3/2004 | Aggarwal et al. | | |
| 6,721,936 B2 | 4/2004 | Bobba et al. | | |
| 6,725,439 B1 * | 4/2004 | Homsinger et al. | | 716/115 |
| 6,823,501 B1 * | 11/2004 | Dahl | | 716/122 |
| 6,976,235 B2 * | 12/2005 | Bobba et al. | | 716/111 |
| 7,086,024 B2 * | 8/2006 | Hsu et al. | | 257/787 |
| 7,197,736 B2 | 3/2007 | Saxena et al. | | |
| 7,530,035 B2 * | 5/2009 | Wang | | 716/104 |
| 7,784,010 B1 * | 8/2010 | Balsdon et al. | | 716/118 |
| 7,797,654 B2 * | 9/2010 | Tai et al. | | 716/111 |
| 7,969,014 B2 * | 6/2011 | Chuang | | 257/776 |
| 7,989,849 B2 * | 8/2011 | Sherlekar et al. | | 257/207 |
| 2005/0242439 A1 * | 11/2005 | DeVries et al. | | 257/758 |

(Continued)

OTHER PUBLICATIONS

Ng; A "gridless" variable-width channel router for macro cell design; 24th ACM/IEEE Design Automation Conference; 1987; pp. 633-636.*

(Continued)

*Primary Examiner* — Naum B Levin
(74) *Attorney, Agent, or Firm* — Cantor Colburn LLP; Margaret McNamara

(57) ABSTRACT

A method of generating a power grid to supply current to a plurality of cells of an integrated circuit includes routing an initial power grid representing a power usage estimate for the plurality of cells. The method also includes performing power grid analysis prior to routing of signal wires to make a determination of whether the initial power grid meets power requirements of the integrated circuit, and selectively modifying portions of the initial power grid based on the performing the power grid analysis to generate the power grid.

14 Claims, 4 Drawing Sheets

(56) References Cited

U.S. PATENT DOCUMENTS

| | | | |
|---|---|---|---|
| 2006/0239102 A1* | 10/2006 | Saita et al. | 365/226 |
| 2008/0066026 A1* | 3/2008 | Tai et al. | 716/4 |
| 2011/0113398 A1* | 5/2011 | Keinert et al. | 716/127 |
| 2011/0304052 A1 | 12/2011 | Turner et al. | |
| 2012/0242149 A1* | 9/2012 | Chuang et al. | 307/42 |

OTHER PUBLICATIONS

IBM, "Temporarily use multiple power rails for increased integrator flexibility", IPCOM000124405D, Apr. 19, 2005, pp. 1-6.

* cited by examiner

US 8,914,765 B2

POWER GRID GENERATION THROUGH MODIFICATION OF AN INITIAL POWER GRID BASED ON POWER GRID ANALYSIS

BACKGROUND

The present invention relates to Very Large Scale Integration (VLSI) circuits, and more specifically, to power grids of VLSI circuits.

VLSI circuits are comprised of many interconnected cells that perform one or more logic functions. For example, a VLSI circuit may be a collection of complementary metal-oxide-semiconductor (CMOS) circuits. Despite continued efforts to scale down circuit components and increase circuit densities, lack of voltage scaling beyond a certain level has led to higher current densities in metal interconnects. The increased current densities ultimately limit scalability because any space occupied by a current-carrying power supply wire can be thought of as space taken away for routing a signal wire.

One approach to addressing the increased current densities involves using a "sandwich structure" that duplicates power wires on vertically adjacent layers. However, this approach is limited to specific library cell images and to the first two metal layers, because it would be impractical to have a wrong-way (i.e., lengthwise perpendicular to most of the other wires) power grid on some of the levels of metal planes higher in the stack. Another approach is to widen power wires within only those cells that are expected to draw significant current through the supply wires. However, the library cells generally only have power pins on the first one or two metal levels. Thus, fixes (wider power wires) to the library cells do not affect power capacity at other levels or the need to design a higher level power grid that can service the worst-case expected current density. Further, even at the local cell level, power and ground buses are often shared at the cell boundaries. Thus, the power buses in the cells have to be wide enough to carry the current required for two high-powered cells, because two such cells may be placed next to each other. Also, the power actually consumed by a high-power cell depends on various factors such as the frequency at which the cell is being operated, the load it drives, etc. Thus, the local power connections in the cell have to be built to handle the worst-case application conditions, as well.

As the above discussion suggests, conventional approaches generally rely on "brute-force" techniques using a pre-planned uniform power grid to provide a robust solution for any conceivable combination of circuits that may be encountered in the VLSI design. This results in over-engineered power grids for much of the circuit design. The cost of providing this type of robust power grid design by the "brute-force" techniques is the unnecessary use of space for power grid wires that could otherwise have been used for signal wires. Thus, the worst-case approach to power grid design has limited the scalability of VLSI circuits. Consequently, a system and method of power grid design that addresses the trade-off between current density and signal wires and the issues presented by previous techniques would be appreciated in the integrated circuit design industry.

SUMMARY

According to one embodiment, a method of generating a power grid to supply current to a plurality of cells of an integrated circuit includes routing an initial power grid representing a power usage estimate for the plurality of cells; performing power grid analysis prior to routing of signal wires to make a determination of whether the initial power grid meets power requirements of the integrated circuit; and selectively modifying portions of the initial power grid based on the performing the power grid analysis to generate the power grid.

According to another embodiment, a non-transitory computer-readable medium includes computer-readable instructions which, when processed by a processor, cause the processor to execute a method of generating a power grid to supply current to a plurality of cells of an integrated circuit. The method includes routing an initial power grid representing a usage estimate for the plurality of cells; performing power grid analysis prior to routing of signal wires to make a determination of whether the initial power grid meets power requirements of the integrated circuit; and selectively modifying portions of the initial power grid, the selectively modifying including adding connecting vias, based on the performing the power grid analysis to generate the power grid.

According to yet another embodiment, a method of designing an integrated circuit comprising a plurality of cells, the method comprising: placing the plurality of cells in an arrangement; routing an initial power grid based on the arrangement; performing power grid analysis to make a determination of whether the initial power grid meets power requirements of the integrated circuit; selectively modifying portions of the initial power grid, the selectively modifying including adding connecting vias, based on the performing the power grid analysis to generate a final power grid; and routing signal wires after the final power grid is generated.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, VLSI circuits have limited wire layout space and, therefore, every power grid wire can be seen as taking the place of a signal wire and vice versa. As a result, the previous approach of overdesigning the power grid has resulted in reduced signal wire space and, therefore, a reduction in the overall density of the integrated circuit. One of the disadvantages of previous approaches has been that power grid current analysis is not done until all signal routing has been completed. That is, cells are placed and signal and power wires are all routed based on a worst-case estimation of power need. Thus, even if a block of cells is found not to need the current allocated to it, removing portions of the power grid at that point does not help since all the signal wires are already in place by that time. Embodiments described below involve placing the cells and calculating current needs prior to signal routing. The result is a more systematic approach that allows starting with a light power grid and building up as needed based on the presence of cells that require more current in a given block. Consequently, signal wire space is not needlessly wasted and the density of the integrated circuit is not unnecessarily compromised.

Figure 1:
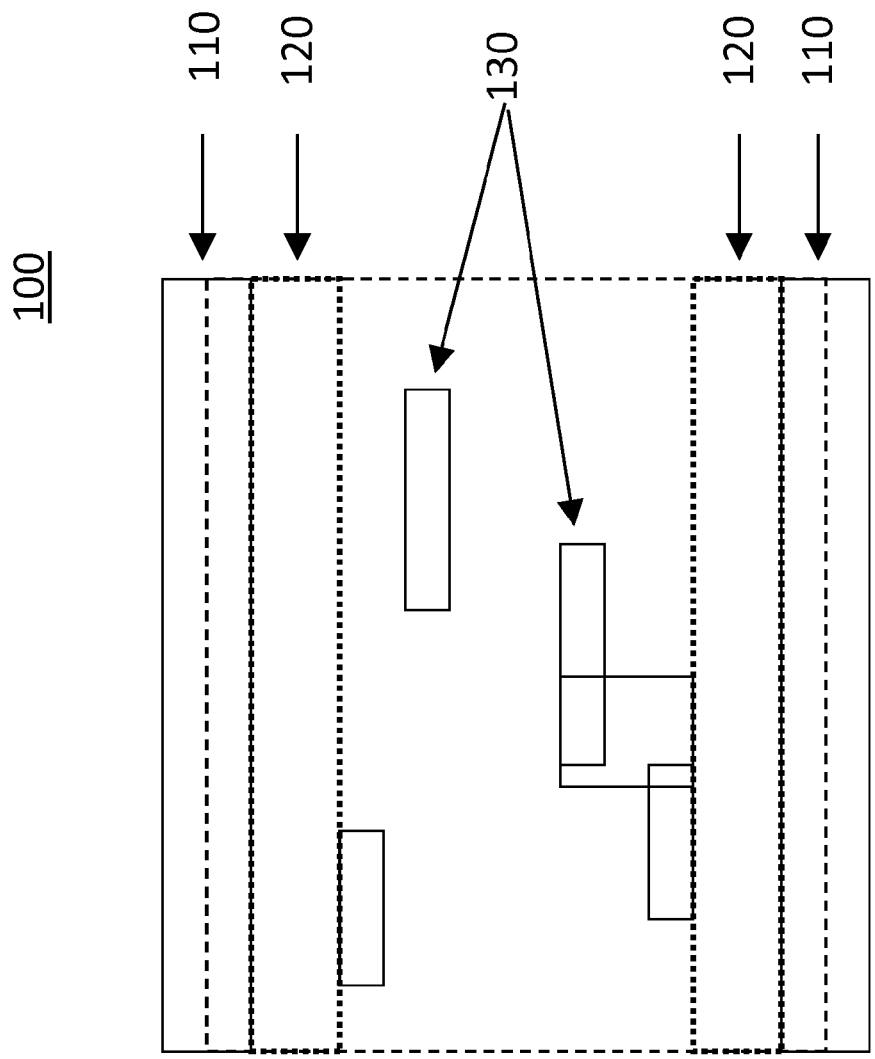
FIG. 1 is a top-view of a cell according to an embodiment.

FIG. 1 is a top-view of a cell 100 according to an embodiment. The cell 100 includes regions for power grid wires 110 and internal cell wires 130. The cell 100 also includes reserved regions 120 (cell wire "keep-out" regions) so that current-carrying wires could be added as needed. The reserved regions 120 facilitate the process of beginning with a light power grid and building up as needed, as detailed below. While FIG. 1 shows one exemplary embodiment of a cell 100 that includes space to accommodate more than a minimum-sized power grid, as needed, other cell designs that can accommodate additional current wires are also within the scope of this description.

Figure 2:
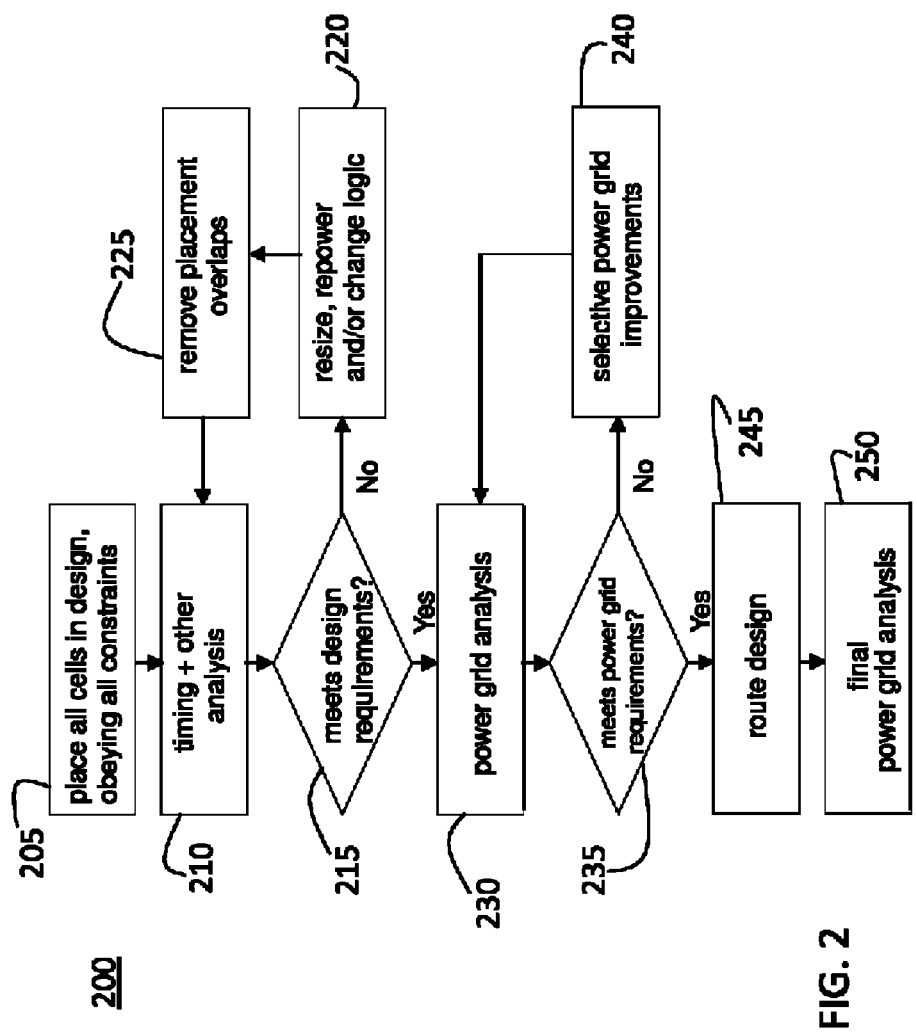
FIG. 2 is a flow diagram illustrating an exemplary method of developing a power grid according to an embodiment.

FIG. 2 is a flow diagram illustrating an exemplary method 200 developing a power grid according to an embodiment. At block 205, the method 200 includes placing all the cells 100 in the design according to all constraints imposed by the designer, including timing parameters, net connectivity, specific structural or placement constraints, or any other constraints imposed by the implementation process, or other factors affecting the circuit design. Once all the cells 100 are placed, timing and/or any other required design analysis is done at block 210 by estimating parasitic characteristics of the interconnect wires assumed for the initial cell 100 layout. Block 210 is part of an iterative process for finalizing the cell 100 placement. At block 215, a determination is made whether the current design meets timing and any other requirements established for the integrated circuit. These timing requirements may be based on a required speed for a system that includes the circuit, for example. Other requirements might include constraints on power dissipation, overall area occupied by the design, etc. Based on the outcome of the determination at block 215, the gates of the cells 100 may be resized, repowered, or changed in other ways at block 220 and placement overlaps of cells 100 removed at block 225. Once the analysis indicates that all design requirements are met by the cell 100 placement, power grid analysis is performed at block 230. In prior systems, this type of power grid analysis, ensuring that the power grid was robust enough everywhere to supply adequate current to the design, could not be done until after all signal wires were routed, and all design parasitic elements extracted from the layout. By this stage, since previous methods had signal wires already routed, the power grid could not be expanded to fix any weakness without running into signal wires. Thus, the "brute-force" method of generating an over-designed power grid was used to preclude any possibility of finding power grid failures at this stage. However, the method 200 according to the embodiment includes power grid analysis (block 230) prior to signal routing. Also, in one or more embodiments, the power grid analysis at block 230 may include refining the calculation of power grid currents by using not only estimated wire capacitances but also simulated switching activity factors, local leakage calculations and the like. Further, timing analysis data including signal slew rates and other information may also be used to improve the power grid current calculation as part of the power grid analysis at block 230.

At block 235, a determination is made whether the existing power grid design meets the power requirements of the integrated circuit. An iterative process is undertaken, as needed, to expand only those portions of the power grid that require additional current wires (grids that require additional metal), or additional or larger connecting vias, through selective power grid improvements at block 240. In alternate embodiments, the process 200 may instead start with all the additional/wider wires in place. In this embodiment, unneeded wires are removed and/or thinned down wherever possible such that the final result is the same. The key feature is that the power grid is adjusted and tuned before the design has been routed. Once the power grid requirements are met, the design is routed at block 245. At this stage (block 245) the signal wires are also included. Prior to signal routing, the processes 200 at block 245 may include timing optimization using electrical information derived from the power grid analysis (block 230) such as local power grid dynamic voltage (IR) drop. At block 250, the final power grid analysis ensures that power requirements of the integrated circuit are met with the signal wires included. The selective power grid improvements at block 240 are one way that the processes 200 differ from prior techniques for creating the power grid. In any integrated circuit design, regions with high pin density where signal wiring congestion tends to be at its worst (e.g., due to large fan-in complex gates) also tend to have the lowest current density requirements, and regions with high current requirements (e.g., large inverters, clock buffers) have lower pin densities and can accommodate a lower number of signal wiring tracks. By selectively increasing the metal tracks only in those regions requiring above-average current supply, at block 240, the remainder of the power grid can be maintained as is and, thereby, accommodate additional signal wires over what a brute-force over-design might accommodate. That is, the reserved regions 120 of the cells 100 that are ultimately not used to selectively increase the power grid may instead be used for signal wires.

Figure 3:
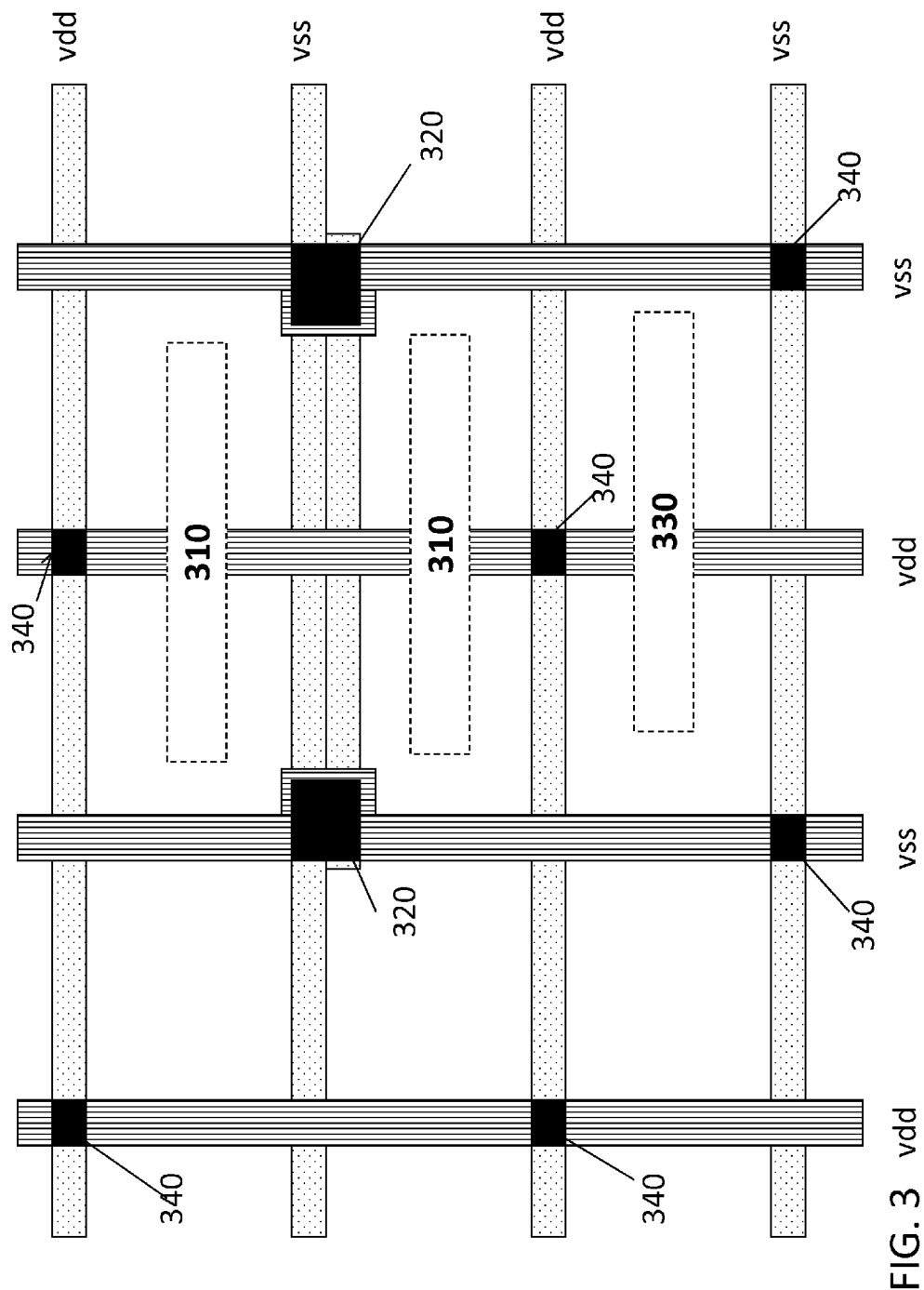
FIG. 3 shows metal levels of a power grid according to an embodiment.

FIG. 3 shows metal levels of a power grid according to an embodiment. Specifically, FIG. 3 shows two metal levels, though a power grid may include many more levels. FIG. 3 illustrates a portion of the power grid resulting from two back-to-back regions 310 of high current density that result in an unusually high local current demand. As illustrated, this demand is addressed locally with additional metal 320 and/or vias only where needed to service the high-demand regions 310. The remainder of the portion of the power grid shown by FIG. 3 indicates an average current demand at other regions. For example, region 330 and other regions require only an average amount of metal 340.

Figure 4:
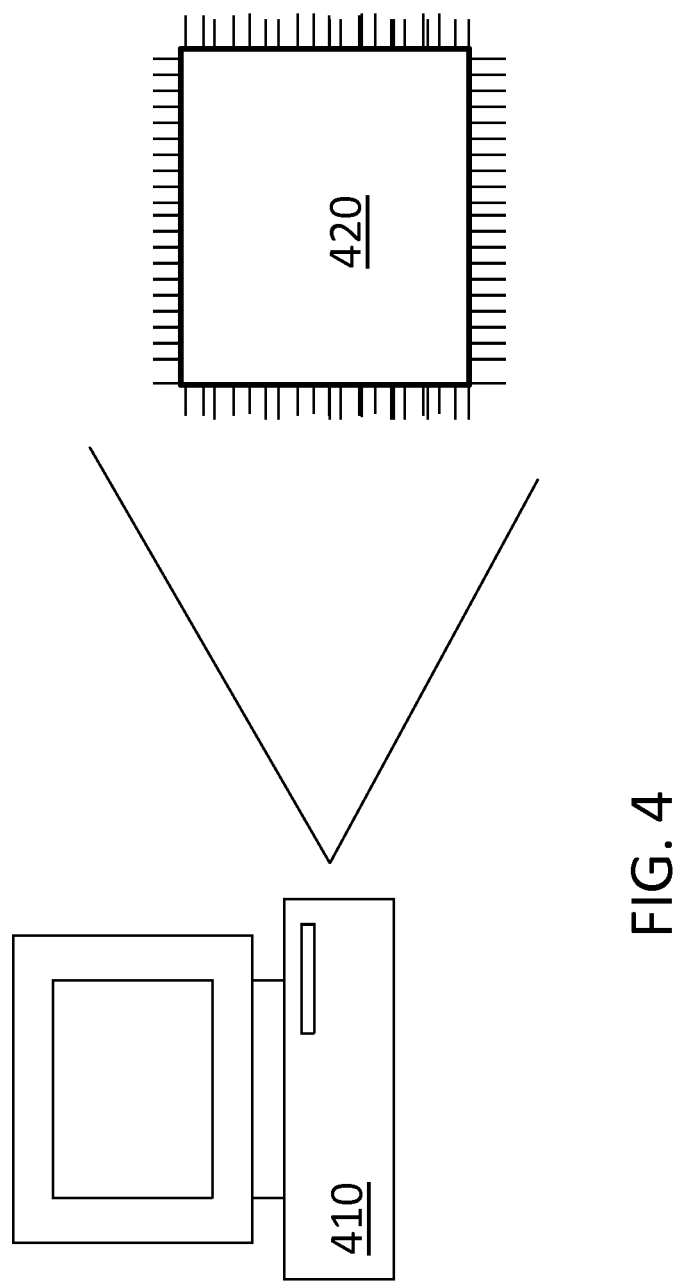
FIG. 4 shows an exemplary system to generate an integrated circuit according to one or more embodiments.

FIG. 4 shows an exemplary system to generate an integrated circuit according to one or more embodiments. The placing and routing and method 200 discussed above are executed by a processor 410. Once the final design including the power grid and signal wire routes is output by the processor 410, that final design is implemented in an integrated circuit 420. That is, the cell placement and power grid design discussed above with reference to the method 200 also correspond with the physical integrated circuit cell placement and power grid design.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of generating a power grid to supply current to a plurality of cells of an integrated circuit, the method comprising:

routing, with a processing device, an initial power grid representing a power usage estimate for the plurality of cells;

performing a power grid analysis prior to routing of signal wires to make a determination of whether the initial power grid meets power requirements of the integrated circuit;

selectively modifying portions of the initial power grid based on the performing the power grid analysis to generate the power grid, the selectively modifying including expanding the initial power grid by adding metal to the portions of the initial power grid that supply current to high-current need regions of the plurality of cells;

routing signal wires after the power grid is finalized; and designing the plurality of cells with one or more keep-out regions that provide space for the selectively modifying.

2. The method according to claim 1, wherein the selectively modifying and the performing the power grid analysis are repeated iteratively based on an outcome of the determination to finalize the power grid.

3. The method according to claim 1, further comprising placing the plurality of cells of the integrated circuit in an arrangement and estimating wiring characteristics based on the arrangement to perform the routing the initial power grid.

4. The method according to claim 3, wherein the placing the plurality of cells includes iteratively performing a design analysis and resizing, repowering, and updating gates of the plurality of cells based on the design analysis.

5. The method according to claim 1, wherein the routing signal wires includes routing signal wires in one or more of the keep-out regions not used for the selectively modifying.

6. A non-transitory computer-readable medium comprising computer-readable instructions which, when processed by a processor, cause the processor to execute a method of generating a power grid to supply current to a plurality of cells of an integrated circuit, the method comprising:

routing, by the processor, an initial power grid representing a power usage estimate for the plurality of cells;

performing a power grid analysis prior to routing of signal wires to make a determination of whether the initial power grid meets power requirements of the integrated circuit;

selectively modifying portions of the initial power grid, the selectively modifying including adding metal at the portions of the initial power grid based on the performing the power grid analysis to generate the power grid;

routing signal wires after the power grid is finalized; and designing the plurality of cells with one or more keep-out regions that provide space for the selectively modifying.

7. The method according to claim 6, wherein the selectively modifying and the performing the power grid analysis is performed iteratively based on an outcome of the determination to finalize the power grid.

8. The method according to claim 6, further comprising placing the plurality of cells of the integrated circuit in an arrangement and estimating wiring characteristics based on the arrangement to perform the routing the initial power grid.

9. The method according to claim 8, wherein the placing the plurality of cells includes iteratively performing a design analysis and resizing, repowering, and updating gates of the plurality of cells based on the design analysis.

10. The method according to claim 6, wherein the routing signal wires includes routing signal wires in one or more of the keep-out regions not used for the selectively modifying.

11. A method of designing an integrated circuit comprising a plurality of cells, the method comprising:

placing, with a processing device, the plurality of cells in an arrangement;

routing an initial power grid based on the arrangement;

performing a power grid analysis to make a determination of whether the initial power grid meets power requirements of the integrated circuit;

selectively modifying portions of the initial power grid, the selectively modifying including adding metal to the portions of the initial power grid based on the performing the power grid analysis to generate a final power grid;

routing signal wires after the final power grid is generated; and designing the plurality of cells with one or more keep-out regions that provide space for the selectively modifying.

12. The method according to claim 11, wherein the placing the plurality of cells includes iteratively performing a design analysis and resizing, repowering, and updating gates of the plurality of cells based on the design analysis.

13. The method according to claim 11, further comprising estimating wiring characteristics based on the arrangement to perform the routing the initial power grid.

14. The method according to claim 11, wherein the routing signal wires includes routing signal wires in one or more of the keep-out regions not used for the selectively modifying.

* * * * *